US008562279B2

(12) United States Patent
Beck et al.

(10) Patent No.: US 8,562,279 B2
(45) Date of Patent: Oct. 22, 2013

(54) LIFTS

(75) Inventors: Adam Beck, West Midlands (GB); Paul Edwards, Dudley (GB)

(73) Assignee: Passenger Lift Services Limited, Oldbury, West Midlands (GB)

( * ) Notice: Subject to any disclaimer, the term of this patent is extended or adjusted under 35 U.S.C. 154(b) by 546 days.

(21) Appl. No.: 12/586,494

(22) Filed: Sep. 23, 2009

(65) Prior Publication Data

US 2010/0080678 A1 Apr. 1, 2010

(30) Foreign Application Priority Data

Sep. 26, 2008 (GB) .................................. 0817643.0

(51) Int. Cl.
*B60P 1/00* (2006.01)

(52) U.S. Cl.
USPC .......................................... 414/546; 414/921

(58) Field of Classification Search
USPC .................. 414/921, 540, 541, 545, 537, 546
See application file for complete search history.

(56) References Cited

U.S. PATENT DOCUMENTS

| | | | | |
|---|---|---|---|---|
| 4,081,091 | A * | 3/1978 | Thorley | 414/545 |
| 4,134,504 | A * | 1/1979 | Salas et al. | 414/558 |
| 4,479,753 | A * | 10/1984 | Thorley | 414/541 |
| 4,664,584 | A * | 5/1987 | Braun et al. | 414/541 |
| 4,718,812 | A * | 1/1988 | Smalley et al. | 414/540 |
| 6,039,528 | A * | 3/2000 | Cohn | 414/546 |
| 6,102,648 | A | 8/2000 | Fretwell et al. | |
| 7,010,825 | B1 * | 3/2006 | Finch Salas et al. | 14/72.5 |
| 7,326,024 | B2 * | 2/2008 | Cohn et al. | 414/546 |

FOREIGN PATENT DOCUMENTS

| | | | |
|---|---|---|---|
| DE | 3820339 | A1 | 12/1989 |
| DE | 8816941 | U1 | 5/1991 |
| EP | 1 491 173 | B1 | 6/2008 |
| GB | 1592542 | | 7/1981 |
| GB | 2 224 992 | A | 5/1990 |
| NL | 1021891 | C2 | 5/2004 |
| WO | 80/02538 | | 11/1980 |
| WO | WO 01/12120 | A1 | 2/2001 |
| WO | WO 2004056300 | A2 * | 7/2004 |
| WO | WO 2007/023387 | A2 | 3/2007 |

OTHER PUBLICATIONS

Archived version of "PLS access Products: NX Magic Floor Lift" from Jul. 3, 2008 (http://web.archive.org/web/20080703223340/http://www.pls-access.co.uk/products_magicfloor.asp).*
Search and Examination Report dated Jul. 3, 2012, for corresponding application No. GB1206523.
European Search Report mailed Apr. 16, 2010 in GB0817643.0 filed Sep. 26, 2008.

* cited by examiner

*Primary Examiner* — Joshua Rudawaitz
(74) *Attorney, Agent, or Firm* — Wegman, Hessler & Vanderburg

(57) ABSTRACT

A lift system for mounting on a vehicle comprising a platform, the platform comprising a main platform and a platform extension slidable relative to the main platform. A handrail is pivotably mounted on the platform and movable between a stowed position and a deployed position. The lift system also comprises handrail deployment means arranged to be actuated by movement of the platform extension to raise the handrail from the stowed position to the deployed position.

9 Claims, 17 Drawing Sheets

LIFTS

CROSS-REFERENCE TO RELATED APPLICATION

This application claims the priority filing benefit of Great Britain Patent Application No. GB 0817643.0 filed Sep. 26, 2008.

FIELD OF THE INVENTION

The present invention relates to lifts for wheelchair users, and in particular to lifts for mounting on vehicles.

BACKGROUND TO THE INVENTION

Wheelchair lifts which can be mounted on vehicles are well known and many of them are arranged to be stowed under the floor of the vehicle, and then powered out and unfolded into a deployed condition in which they can be raised and lowered in use. In order to deploy a lift, as well as driving it outwards from under the vehicle floor area, it is also generally necessary to unfold handrails, bridge plates and roll-off ramps, and this generally requires a number of actuation mechanisms which can be, for example, electric or hydraulic.

SUMMARY OF INVENTION

The present invention provides a lift system for mounting on a vehicle. The lift system may comprise a platform, which may comprise a main platform and a platform extension. The platform extension may be slidable relative to the main platform. The system may further comprise a handrail pivotably mounted on the platform and movable between a stowed position and a deployed position. The system may further comprise handrail deployment means arranged to be actuated by movement of the platform extension to raise the handrail from the stowed position to the deployed position.

The deployment means may comprise a cam member and a cam follower, the cam member being arranged to move the cam follower to raise the handrail as the platform extension is moved. The cam member may be mounted on one of the main platform and the platform extension, and the cam follower may be mounted on the other of the main platform and the platform extension.

The deployment means further comprises a rotatable member to which the cam follower is connected and which is arranged to be rotated by the cam follower to raise the handrail. The rotatable member may be arranged to rotate about an axis perpendicular to the axis about which the handrail pivots. The rotatable member may be connected to the handrail by means of an actuation rod, which may have a Rose joint at least one end. The rotatable member may be connected to the handrail by means of a gear mechanism.

The cam member may extend along one side of the platform extension.

The system may further comprise a further handrail and a further deployment means arranged to raise the further handrail from a stowed position to a deployed position. One of the handrails may be arranged to extend over the other when they are both in their stowed positions, and the two deployment means may be arranged to raise said one of the handrails before the other. Each of the deployment means may include a respective cam, and the cams profiles may be arranged to control the timing of the raising of the two handrails.

The present invention further provides a lift system for mounting on a vehicle comprising a main platform, a platform extension slidable relative to the main platform, lifting arms arranged to connect the platform to a vehicle, and a fluid actuation system comprising a pump, a first cylinder arranged to control raising and lowering of the lift on the lifting arms, a second cylinder arranged to control movement of the platform extension relative to the main platform, and valve means arranged to control the flow of fluid between the pump and the two cylinders thereby to control raising and lowering of the lift and movement of the platform extension relative to the main platform.

The valve means may be arranged on deployment of the lift system, to direct fluid to the first cylinder to raise the lift and, when the lift reaches its upper limit of travel, to direct fluid the second cylinder. The fluid actuation system may further comprise a third cylinder arranged to control movement of the roll-off ramp and the valve means is further arranged to control the flow of fluid between the pump and the third cylinder. The valve means may include a closable valve that can be closed to isolate the second cylinder, thereby allowing the lift to be raised and lowered while the platform extension is maintained in a deployed position relative to the main platform.

Preferred embodiments of the present invention will now be described by way of example only with reference to the accompanying drawings.

DESCRIPTION OF THE PREFERRED EMBODIMENTS

Figure 1:
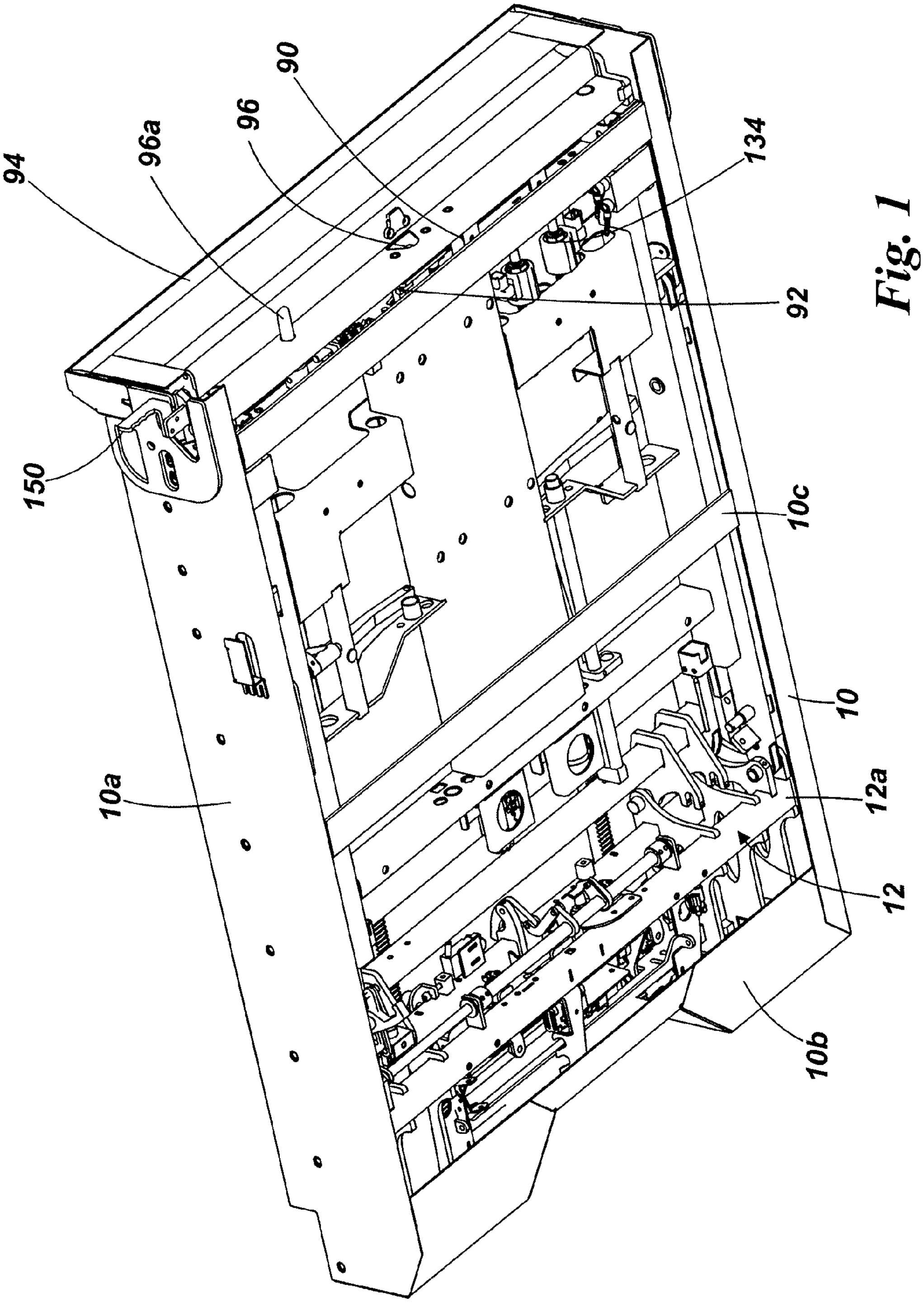
FIG. 1 is an underside perspective view of a lift system according to an embodiment of the invention in a stowed condition.
Figure 2:
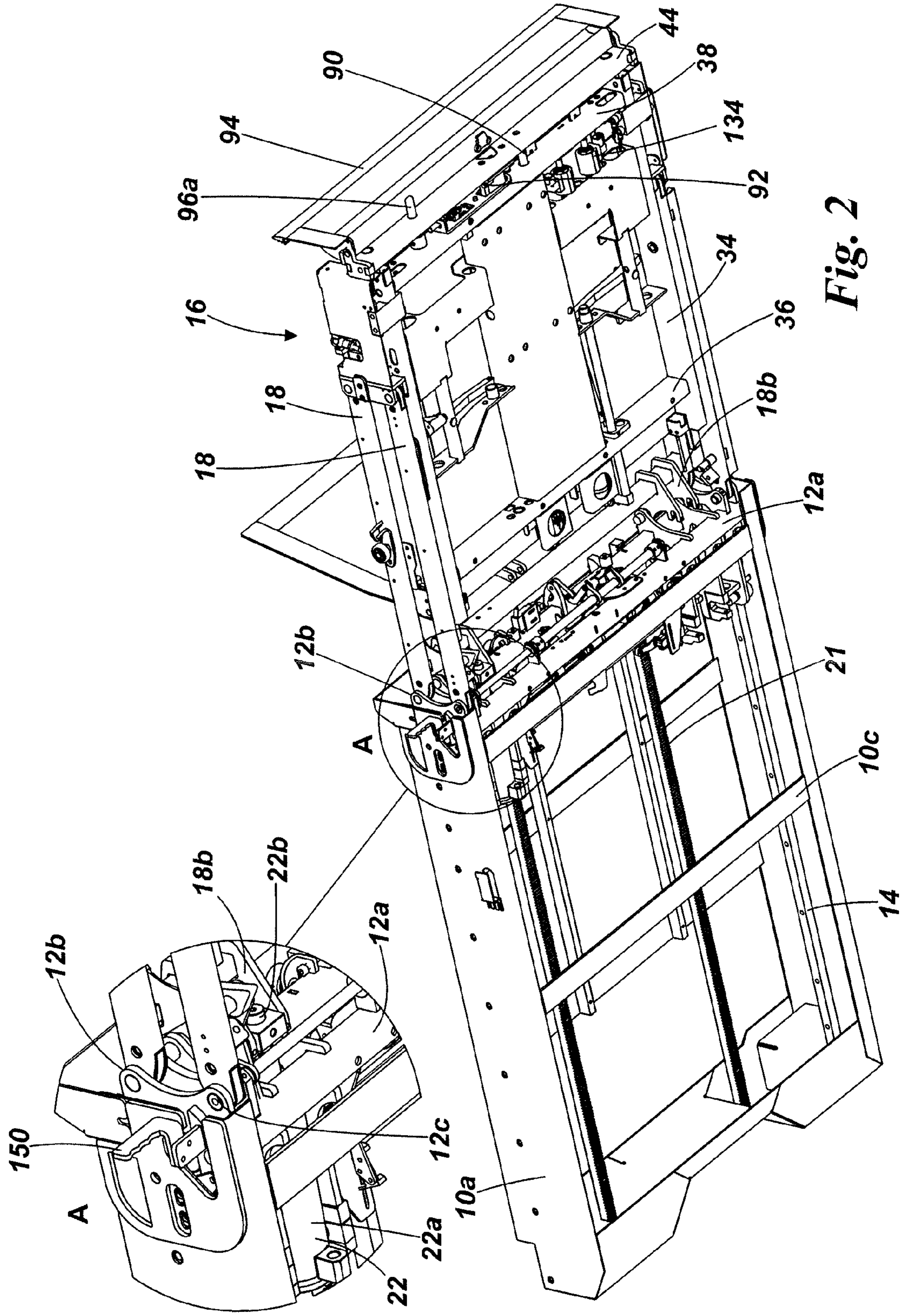
FIG. 2 is an underside perspective view of the lift system of FIG. 1 in a partially deployed condition.

Referring to FIGS. 1 and 2, a lift system for a vehicle comprises a lift stowage box 10 mounted under the floor of a vehicle and including two side panels 10*a*, a back panel 10*b* and cross members 10*c*, a carriage 12 movably mounted on rails 14 which are mounted on the box side panels 10*a*, a lift platform assembly 16 and two pairs of lift arms 18 connecting the platform assembly to the carriage 12. The carriage 12 comprises a cross member 12*a* with a lift arm support bracket 12*b* at each end. Each lift arm support bracket 12*b* supports upper and lower hinge pins 12*c* on which the inner ends of the upper and lower lift arms forming one of the pairs of lift arms is mounted. A lift deployment actuator comprises an electric motor arranged to drive pinions acting on racks 21 which are arranged to move the carriage 12 along the rails 14 relative to the stowage box 10 to move the lift between a stowed position inside the stowage box, as shown in FIG. 1, and a deployed position in which the platform assembly is outside the stowage box 10 and supported on the lift arms 18 as shown in FIG. 2.

A cross bar 18*a* extends between the two upper lift arms and a lift actuation bracket 18*b* extends downwards from the cross bar 18*a* near each end. A pair of lifting actuators 22 is mounted on the carriage 12 each comprising a cylinder 22*a*, and a piston 22*b* which is connected to one of the lift actuation brackets 18*b*. The lifting actuators 22 can therefore be operated to raise and lower the lifting arms 18.

Figure 4:
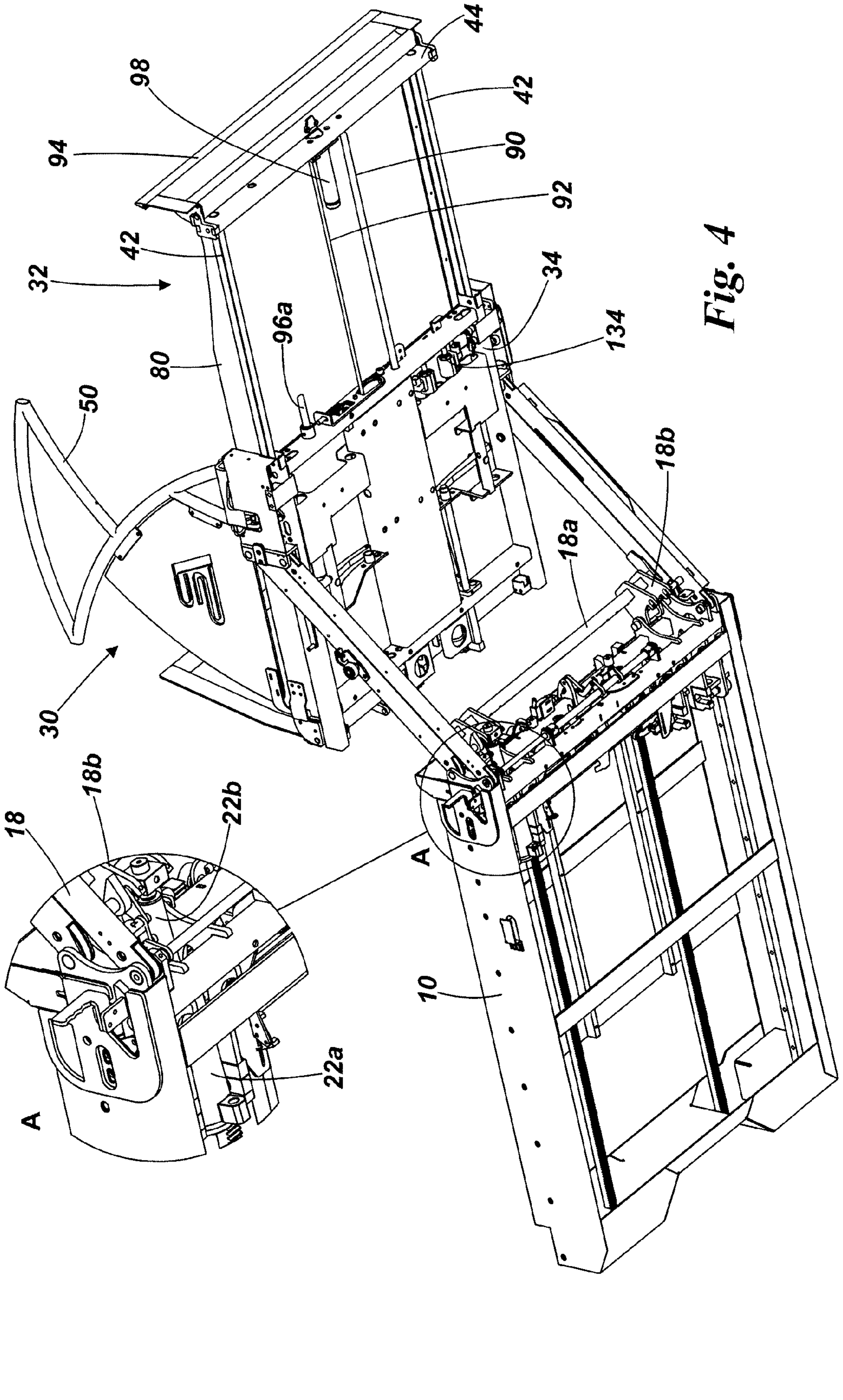
FIG. 4 is an underside perspective view of the lift system of FIG. 1 in a fully deployed and raised condition.
Figure 5:
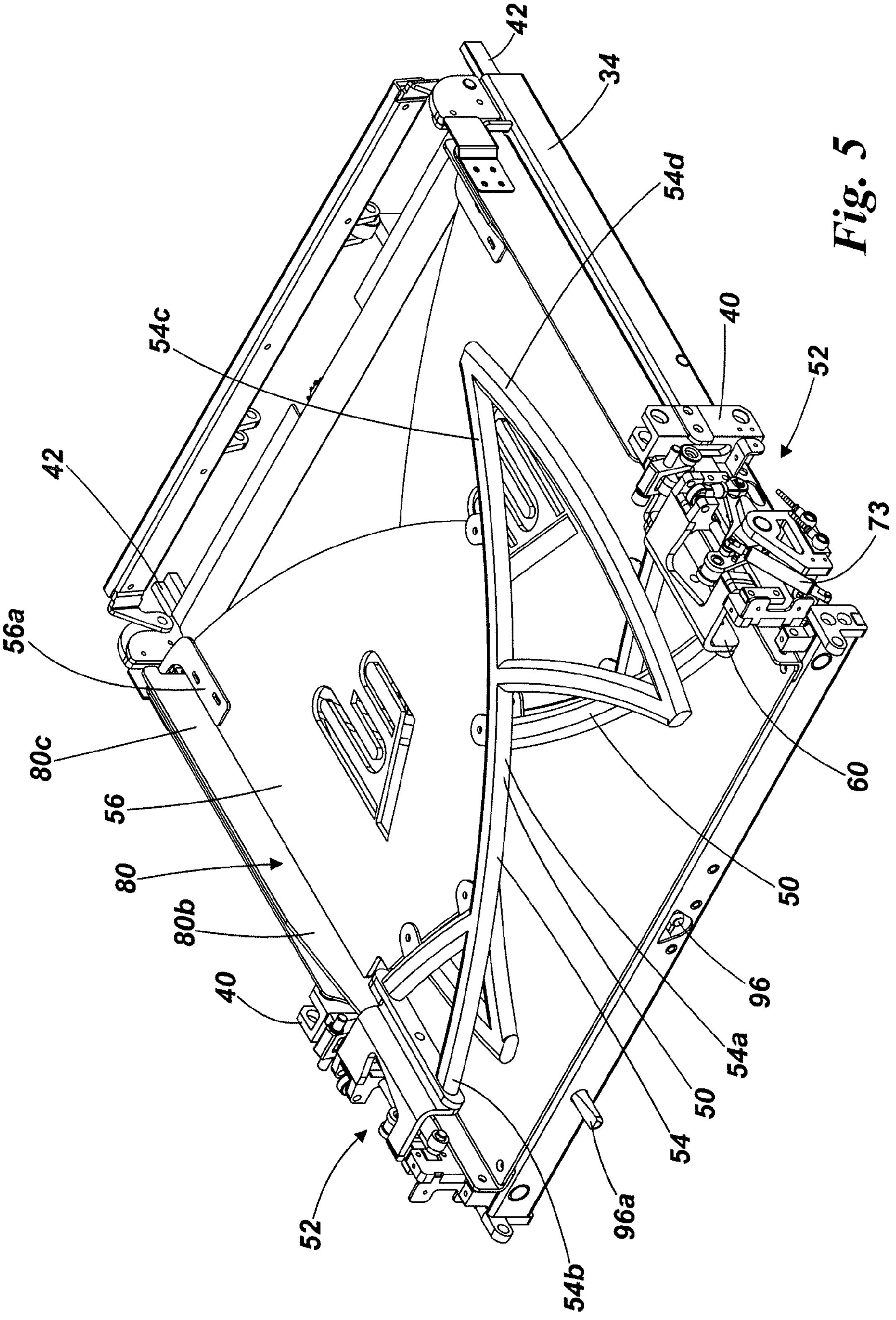
FIG. 5 is a top perspective view of a platform assembly of the system of FIG. 1 in a stowed condition.

The platform assembly 16 comprises a main platform 30 and a platform extension 32. The main platform 30 comprises a rectangular frame formed of a pair of side beams 34, a rear beam 36 and a front beam 38. The lift arms 18 are pivotably connected to the side beams 34 of the frame by means of brackets 40. The platform extension 32 comprises a pair of side beams 42 and a front beam 44. The side beams 42 of the platform extension are slidably supported within the side beams 34 of the main platform 30, so that the platform extension 32 can slide relative to the main platform 30 between a stowed position as shown in FIG. 2 and an extended position as shown in FIG. 4 in which it extends from the front edge of the main platform 30. Referring to FIG. 5, a pair of handrails 50 is pivotably mounted on the side beams 34 of the main platform 30 by means of hinge assemblies 52. Each of the hinge assemblies 52 is located towards the front end of the main platform 30 to the front of the lift arm brackets 40. Each handrail 50 comprises a metal frame 54 having a main curved portion 54*a* the lower end 54*b* of which is branched and the upper end 54*c* of which is also branched to support the ends of a rail portion 54*d*. A plastics panel 56 is provided behind each of the metal frames 54, having its lower rear corner 56*a* hingedly connected to the rear end of the platform side beam 34 so that it can be folded up and down with the frame 54.

Figure 6:
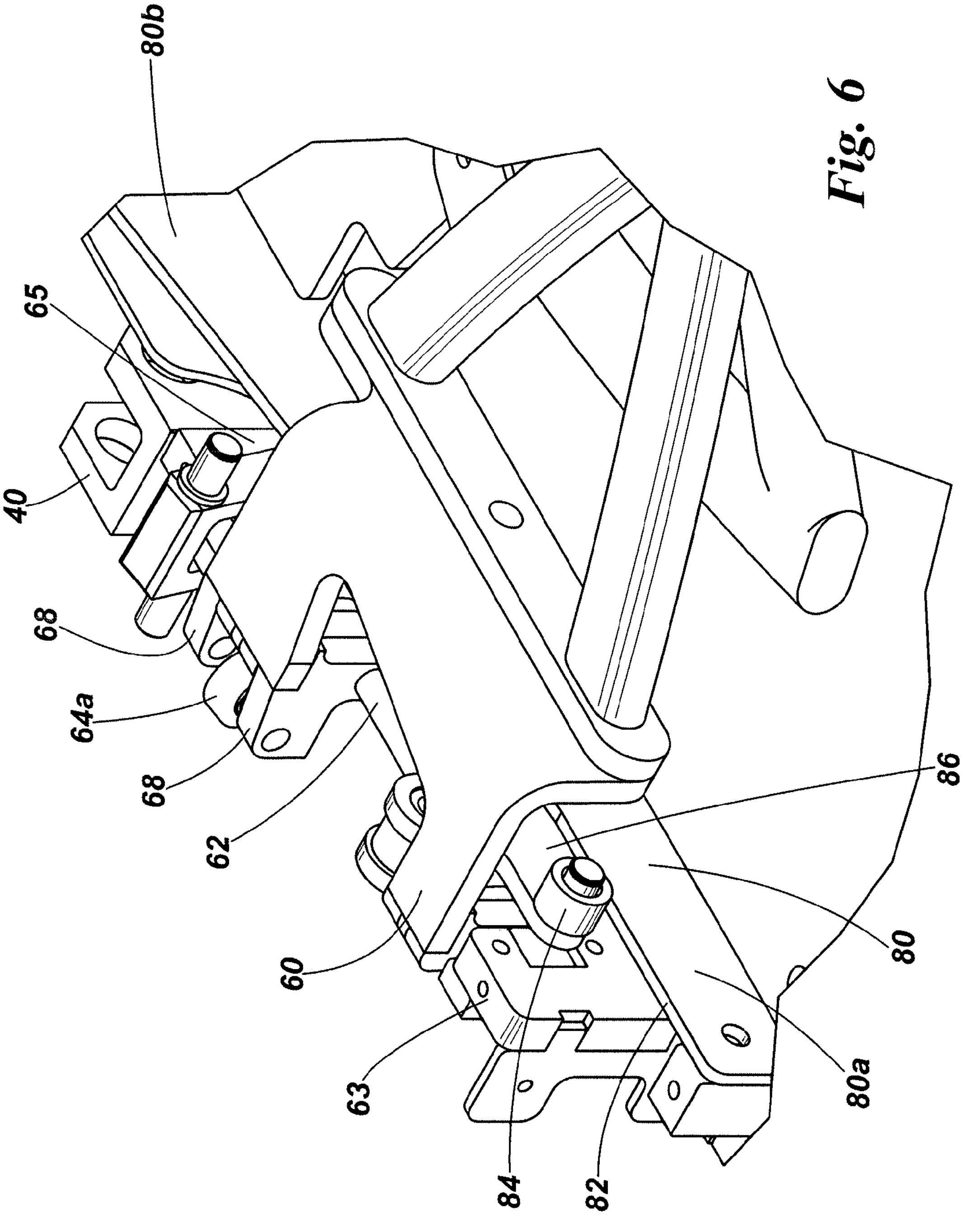
FIG. 6 is an enlargement of part of FIG. 5.
Figure 7:
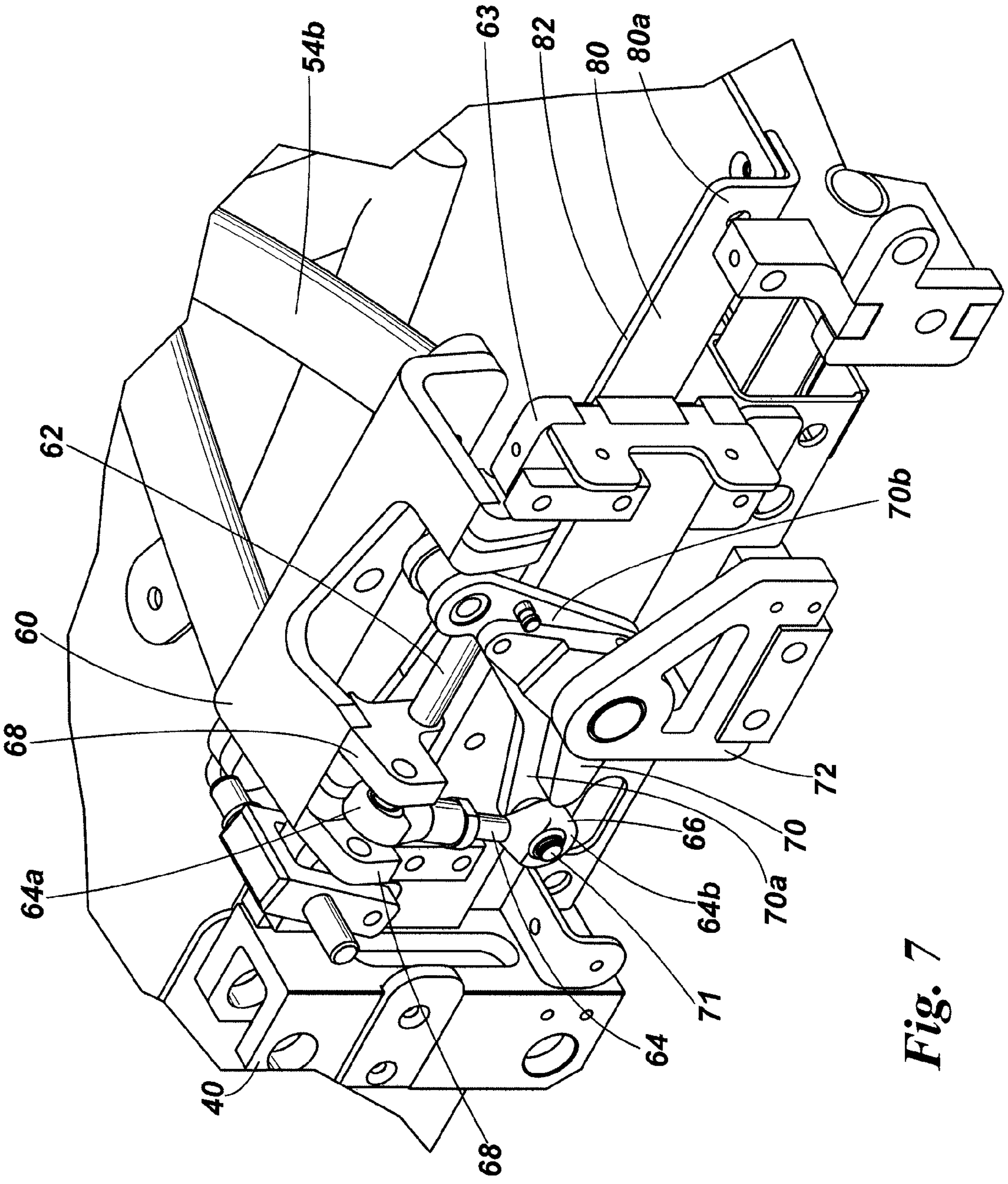
FIG. 7 is a perspective view of a handrail hinge and actuation mechanism of the platform assembly of FIG. 5.

Referring to FIGS. 5, 6 and 7, each of the hinge assemblies 52 comprises an upper hinge member 60 which is pivotably supported on a hinge pin 62 which extends parallel to the sides of the main platform 30 and is supported on the side beam 34 by means of a front hinge support block 63 and a rear hinge support block 65. The upper hinge member 60 is rigidly connected to the lower end 54*b* of the handrail frame 54. At the rear end of the upper hinge member 60 a pair of arms 68 support a pin (not shown) which is parallel to, but outboard of, the hinge pin 62, and which supports the upper end 64*a* of a handrail actuator rod 64, which is adjustable in length and has a Rose joint 66 at each end. A handrail actuator lever 70 is pivotably supported on a support bracket 72 so that it can pivot about a pivot axis which is horizontal and perpendicular to the sides of the platform. The lever 70 has a first arm 70*a* extending rearwardly to which the lower end 64*b* of the rod 64 is connected by a further pin 71, and a second arm 70*b* extending upwards from the lever's pivot axis. A cam plate 80 extends along each side of the platform extension 32. The cam plates 80 extend vertically upwards from the platform extension 32 and vary in height along their length. Each of them has a flat front portion 80*a* where the cam surface is horizontal and lowest, a sloped portion 80*b* behind the front portion, and a flat rear portion 80*c* where the cam surface is horizontal and highest. The sloped portion 80*b* is the same length on either side, but on one side it is closer to the front of the platform extension than on the other. The top surfaces 82 of the cam plates 80 form can surfaces. A roller cam follower 84 rests on the cam surface 82 and is supported at one end of a cam lever 86 which in turn is connected to the end of second arm 70*b* of the handrail actuator lever 70. The cam plates 80 and cam followers 84 therefore form cam mechanisms which, as the platform extension 32 moves relative to the main platform 30, rotate the handrail actuator levers 70 and rotate the handrails 50 via the actuator rods 64, as will be described in more detail below. A handrail damper 73, shown in FIG. 5, acts between the actuator lever 70 and the main platform side beam 34 to damp movement of the handrail 50 between its folded and deployed positions. A return spring may also be provided to urge the handrail 50 into its folded position.

A hydraulic actuator in the form of an extension rod 90 is arranged to act between the main platform 30 and the platform extension 32 to move the platform extension 32 towards its extended position. The rod 90 is acted on by an extension cylinder 91 (see FIG. 8). The front end of the rod 90 rests freely against an abutment surface on the front beam 44 of the platform extension, so that it experiences low or no lateral forces from the platform extension which might otherwise tend to cause it to become misaligned with its actuation cylinder 91. A gas spring operated return mechanism 92 is arranged to retract the platform extension 32 back into its stowed position within the main platform 30 when the extension rod 90 is not actively pushing it out. A roll-off ramp 94 is hingedly mounted on the front edge of the platform extension 32 so that it is movable between a deployed position, which is substantially horizontal and a stowed position which is substantially vertical. A roll-off ramp actuator 96 is controlled by a roll-off ramp cylinder 98, being extended by hydraulic fluid in the cylinder 98 to raise the roll-off ramp 94, and retracted by a return spring 99 to lower the roll-off ramp 94 when the cylinder 98 is de-pressurized. A ramp locking pin 96*a* projects from the front of the main platform 30 and engages with the roll-off ramp 94 when the platform extension 32 is in the retracted position to lock the roll-off ramp in the upright stowed position as shown in FIG. 1.

Figure 8:
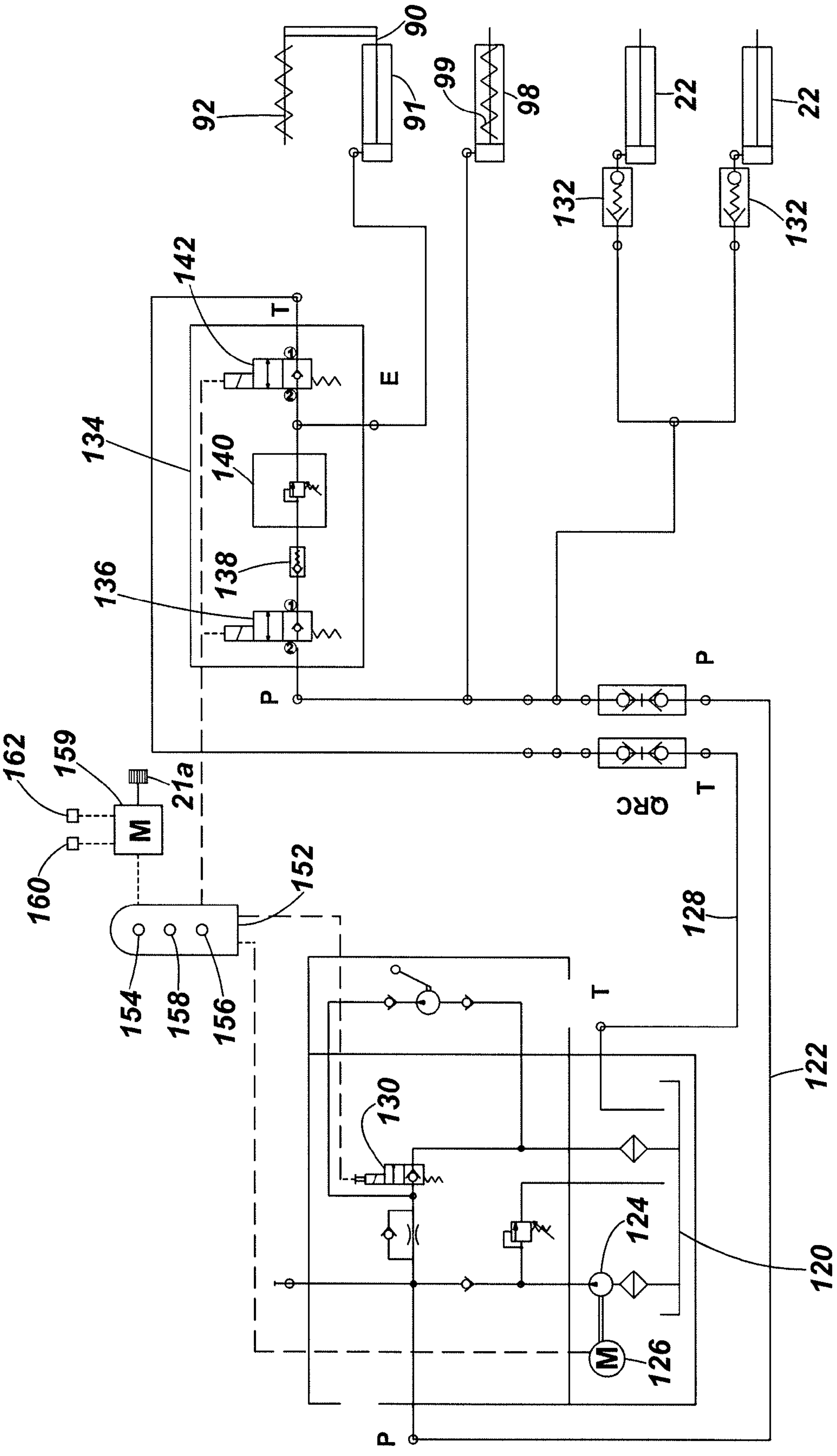
FIG. 8 is a diagram of the hydraulic control system of the lift system of FIG. 1.

Referring to FIG. 8, the hydraulic control system for the lift comprises a hydraulic reservoir 120, a pressure line 122 to which fluid is supplied under pressure from the reservoir by a pump 124 powered by a motor 126 and a tank line 128 for returning fluid to the reservoir 120. A depressurizing valve 130 is connected between the pressure line 122 and the reservoir 120. This valve 130 is normally closed and can be opened by an electric control signal to depressurize the pressure line 122. The lifting cylinders 22 are connected to the pressure line 122. A burst valve 132 is connected between each of the lifting cylinders 22 and the pressure line 122 to limit the pressure produced in the pressure line 122 by forces acting on the lift platform 30. The roll-off ramp cylinder 98 is also connected to the pressure line 122. An extension cylinder control circuit 134 is connected between the pressure line 122 and the tank line 128 and the extension cylinder 91 to control operation of the extension cylinder 91. This circuit comprises a pressure cartridge valve 136, a check valve 138 and an adjustable pressure sequence valve 140 connected in series between the pressure line 122 and the extension cylinder 91, and a tank cartridge valve 142 connected between the extension cylinder 91 and the tank line 128. Each of the cartridge valves 136, 142 is normally closed, and can be opened by an electric control signal. A hand held unit 152 controls the three switchable valves 120, 136, 142 as well as the electric screw actuators 21 that stow and deploy the lift. The hand held unit 152 is provided with three buttons, and out/up button 154, a down/in button 156 and a stow button 158. The hand held unit 152 is also connected to the DC motor 159 which drives the pinions 21*a* that drive the racks 21 to move the lift in and out of the stowage box 10. The motor 159 is also connected to a microswitch 160 which detects when the lift is fully extended from the stowage box 10, and another microswitch 162 which detects when the lift is fully stowed in the stowage box 10.

Figure 3:
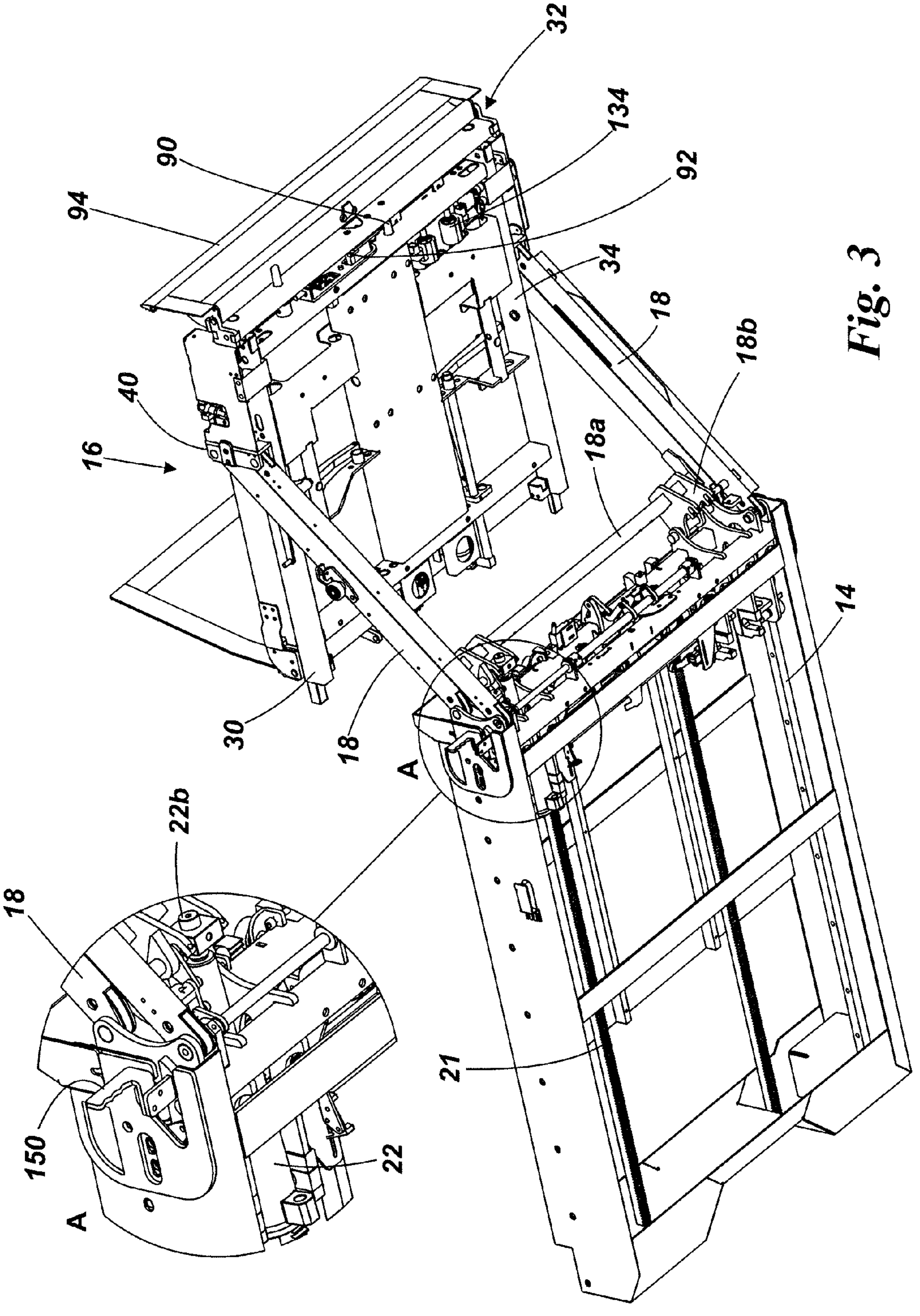
FIG. 3 is an underside perspective view of the lift system of FIG. 1 in a partially deployed and raised condition.

When the lift is not in use it is stowed in the box 10 as shown in FIG. 1. In this condition the handrails 50 are both folded down to lie horizontally, one on top of the other, as shown in FIG. 5, and the roll-off ramp 94 is folded up. The lift is locked in the stowed position by a box lock operated by a manual lock handle 150. When the lift is to be deployed, the box lock handle 150 is lifted to unlock the lift, and the out/up button 154 is pressed. In response to this the hand held unit 152 starts DC motor 159 which drive pinions 21*a* acting on the racks 21 to drive the carriage 12 along the rails 14 to move the lift into the deployed position as shown in FIG. 2. When the carriage 12 reaches the end of its travel in the outward direction, this is sensed by the microswitch 160 which stops the DC motor 159. At this point the lift is still supported by the rear end of the platform extension side beams 42, which project from the rear of the platform, resting on a carriage lock mechanism. The carriage lock mechanism supports the lift, and while it does so allows the carriage 12 to move along the rails 14. In response to a signal from the microswitch 160 the pump 124 is turned on to pressurize the pressure line 122 in the hydraulic circuit, and the pressure cartridge valve 136 is opened. As the pressure increases to a first pressure sufficient to raise the lift, the lifting cylinders 22 start to raise the lift. As the lift starts to rise it lifts off the carriage lock mechanism, which prevents movement of the carriage while the lift is in use. When the lift reaches its highest point, level with the floor of the vehicle, as shown in FIG. 3, its upward movement is checked, and further increase in hydraulic pressure opens the pressure sequence valve 134, and is also sufficient to open the check valve 138, and causes the extension cylinder 91 to start to move the platform extension 32 outwards towards its extended position by driving the rod 90 forwards. The pressure sequence valve 134 controls the pressure of the fluid reaching the extension cylinder, and the fluid flow rate is determined by the flow rate of the pump which, together with the diameter of the cylinder 98, determines the rate of movement of the platform extension.

Figure 9:
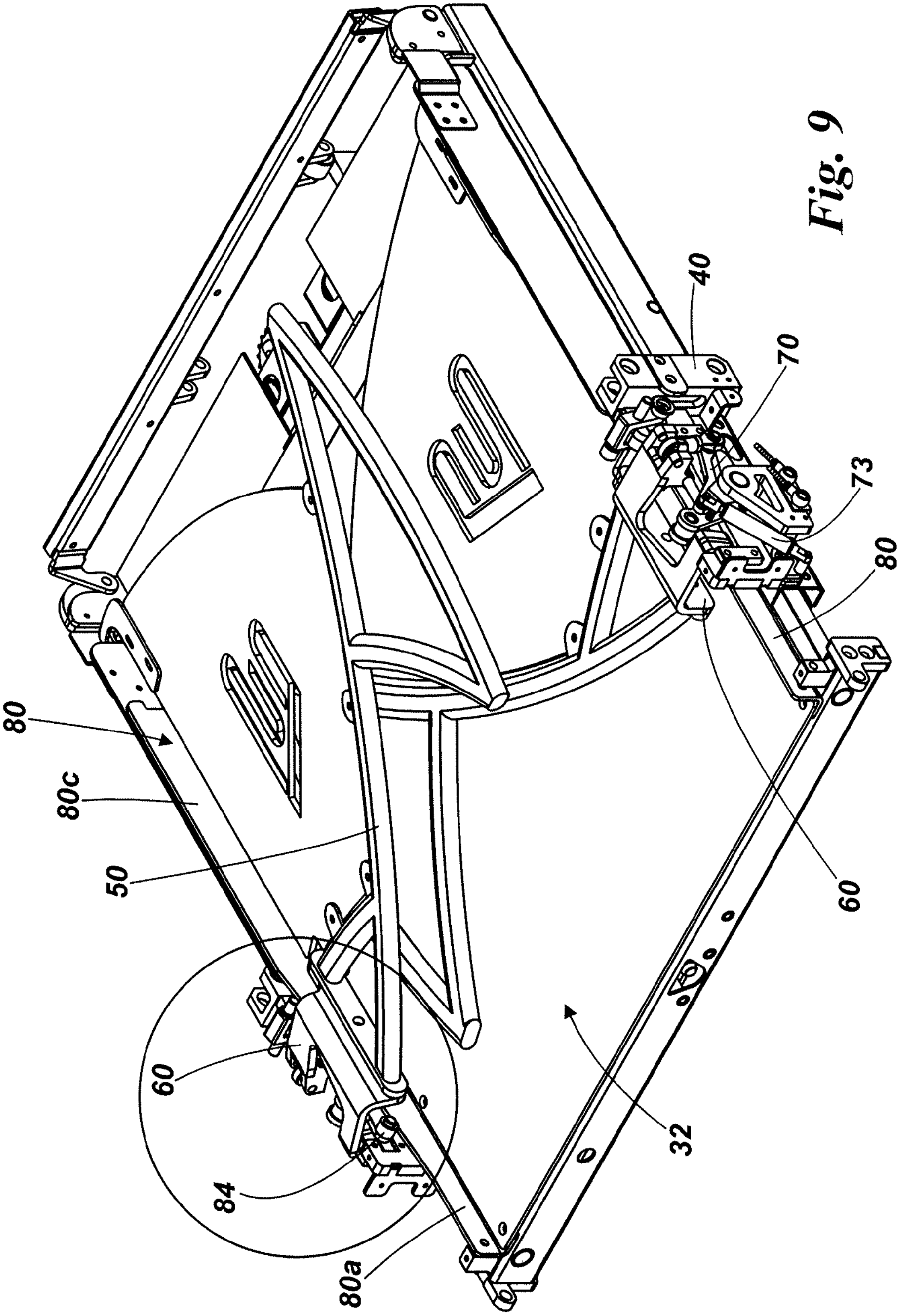
FIG. 9 is a perspective view similar to FIG. 5 of the platform assembly in a partially deployed condition.
Figure 10:
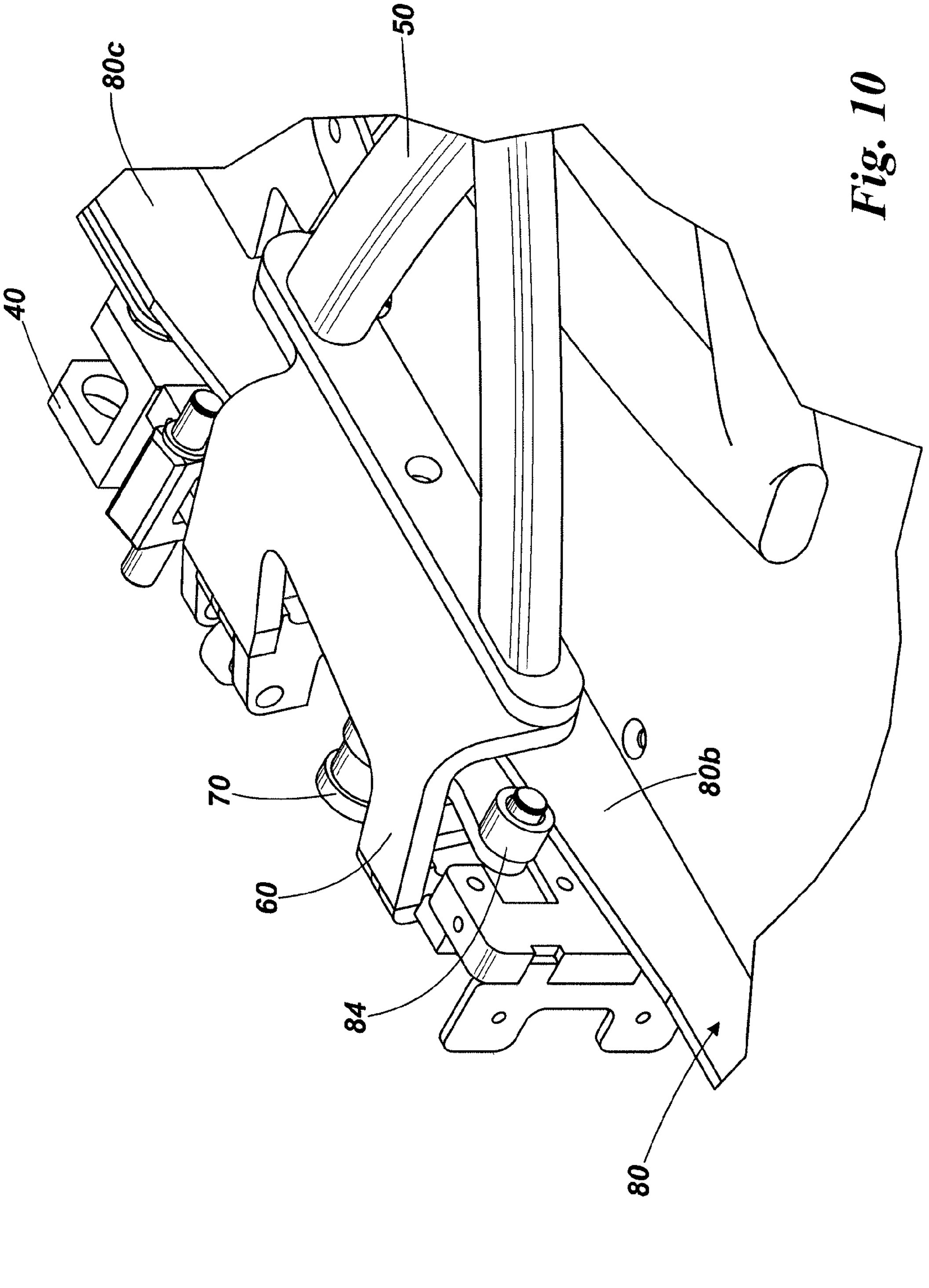
FIG. 10 is an enlargement of part of FIG. 9.
Figure 11:
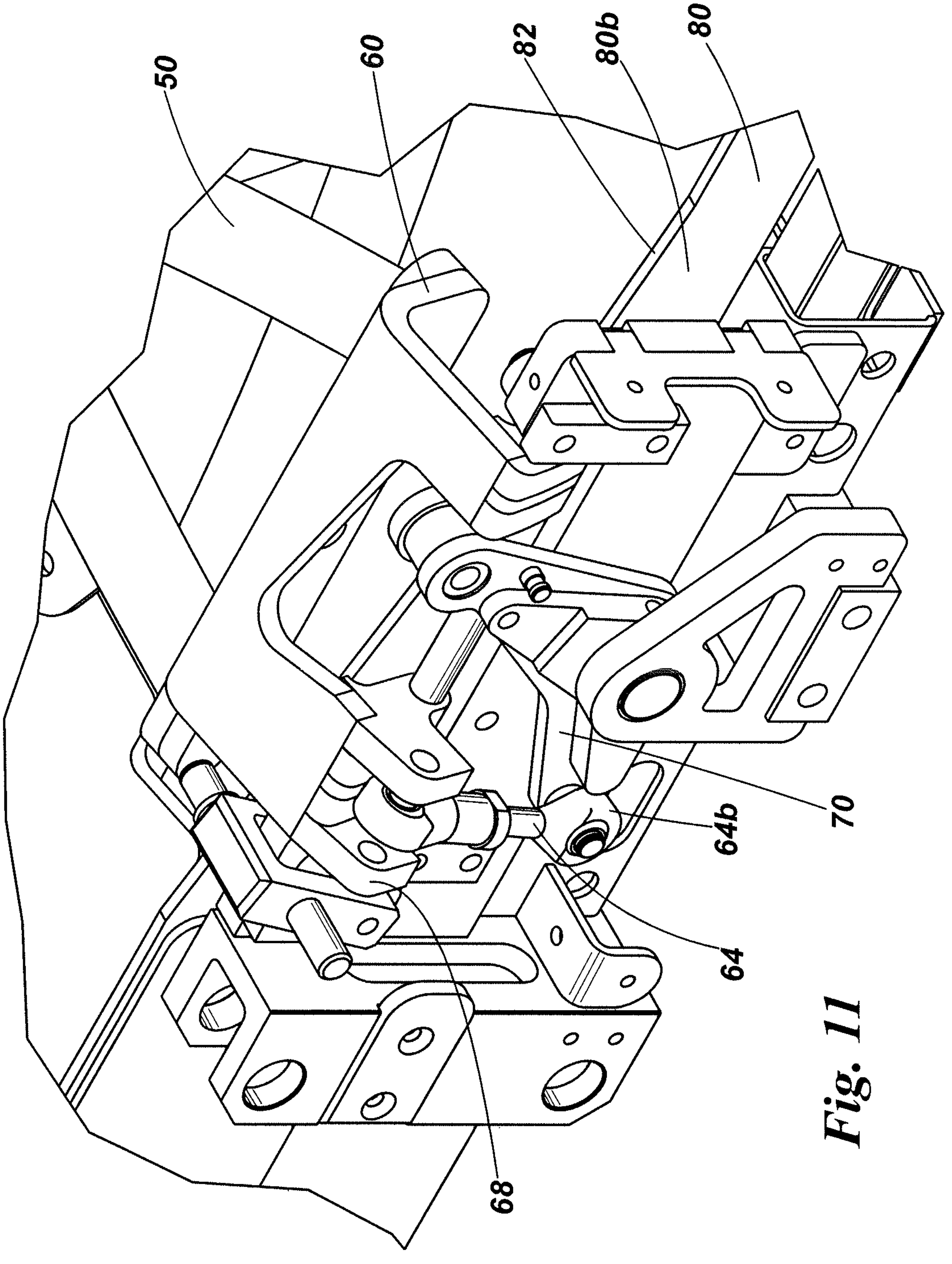
FIG. 11 is a view similar to FIG. 7 of the hinge and actuation mechanism in a partially deployed condition.
Figure 12:
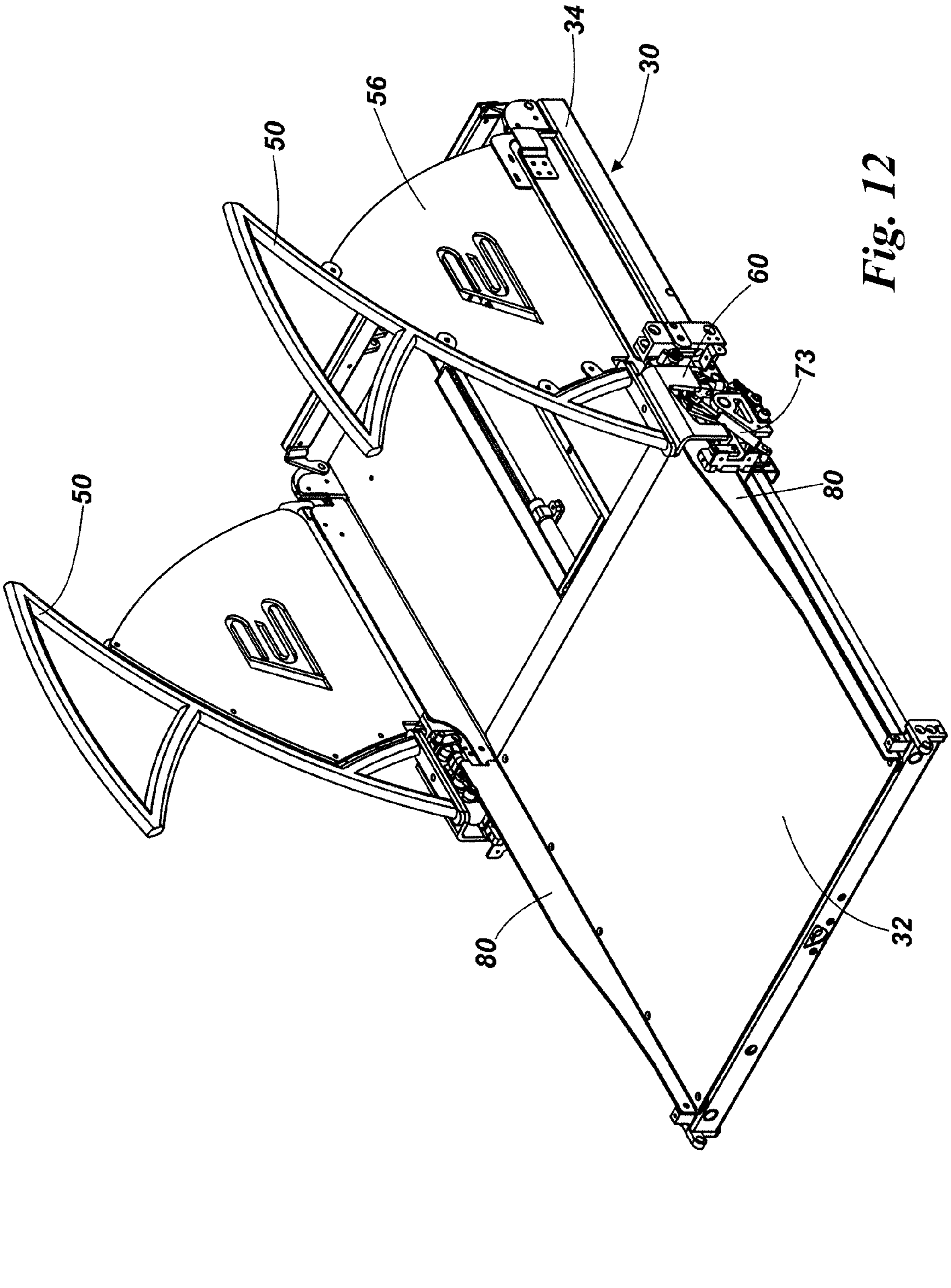
FIG. 12 is a perspective view similar to FIG. 5 of the platform assembly in a fully deployed condition.
Figure 13:
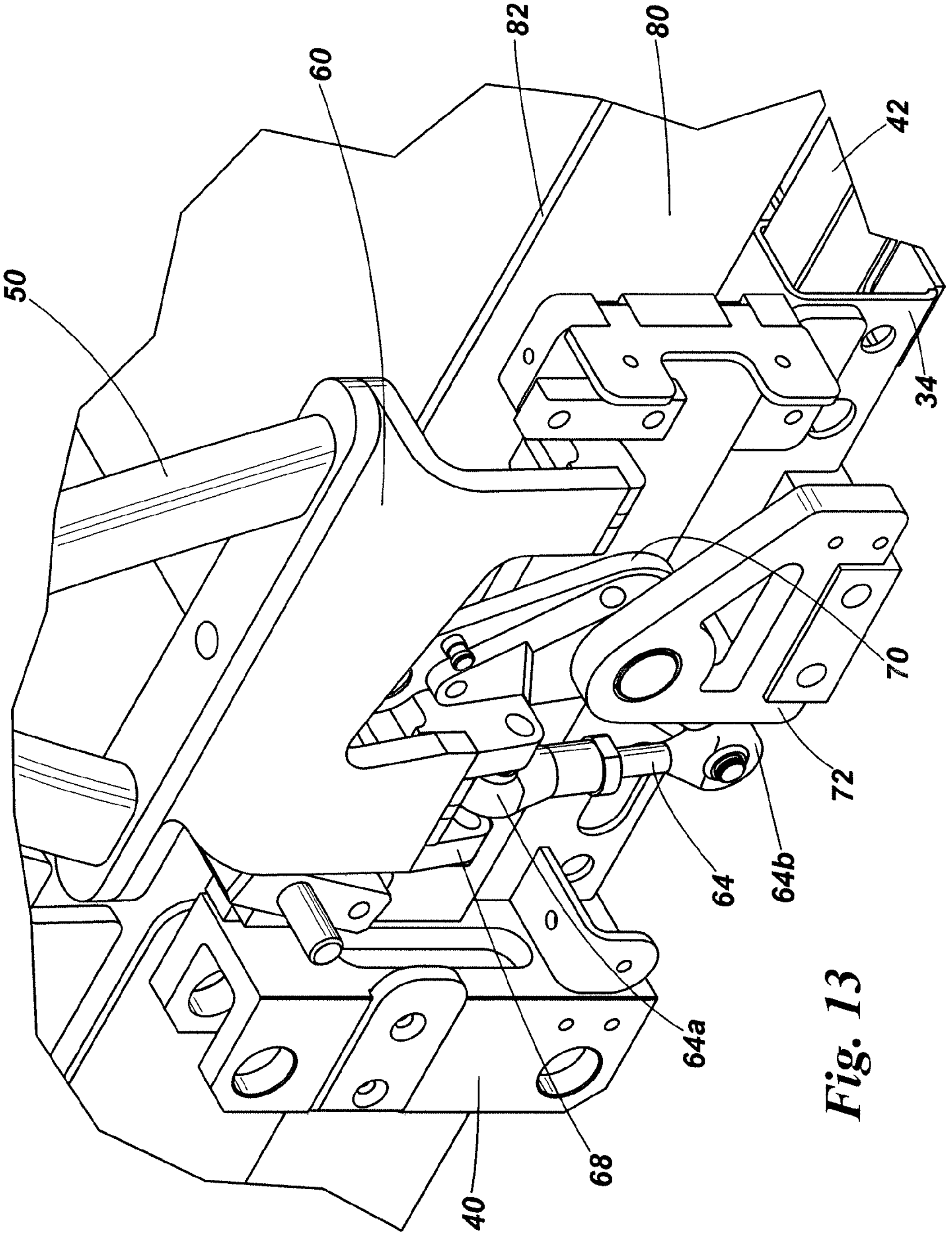
FIG. 13 is a view similar to FIG. 7 of the hinge and actuation mechanism in the fully deployed condition.
Figure 14:
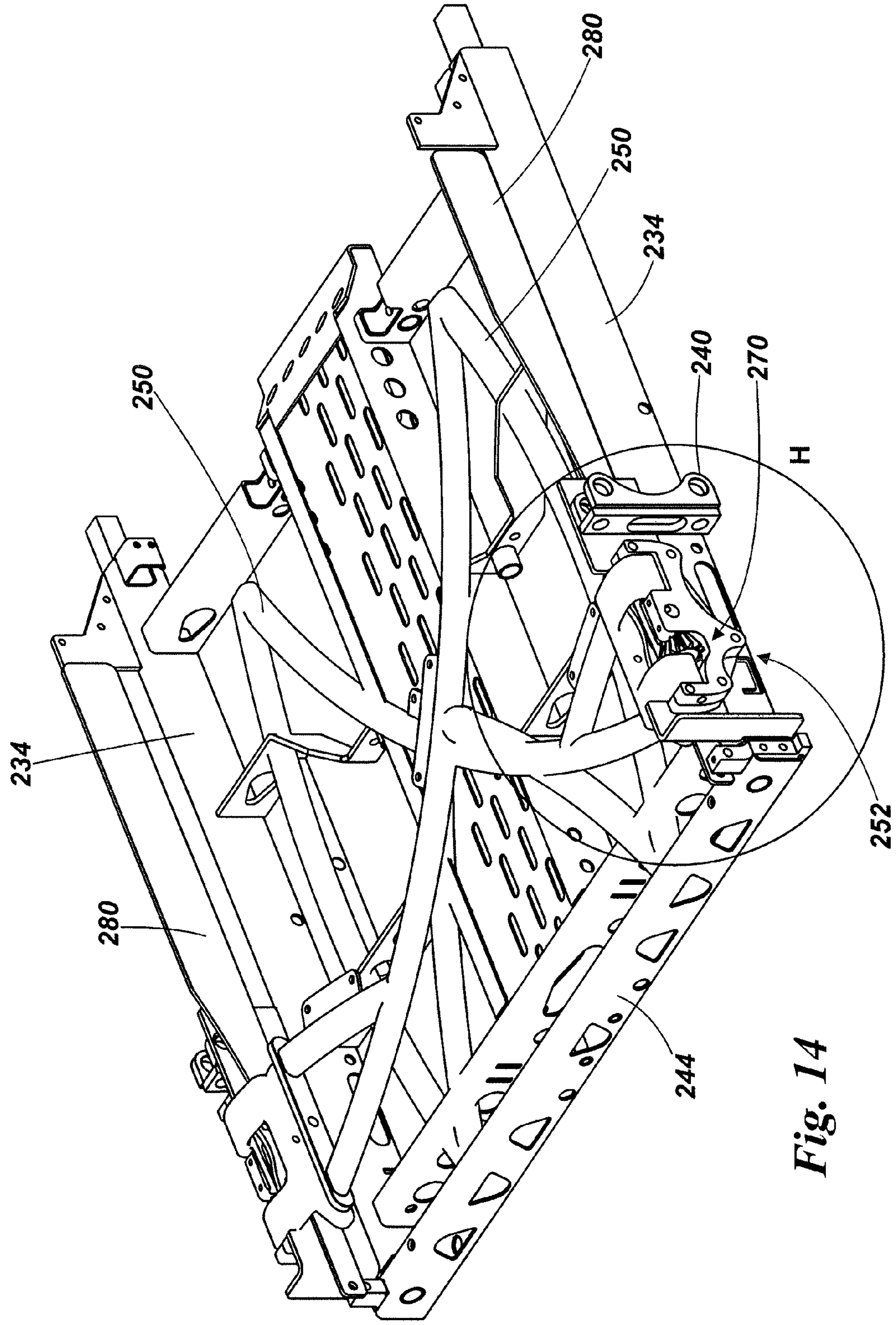
FIG. 14 is a top perspective view of a platform assembly of a lift according to a further embodiment of the invention in a stowed condition.
Figure 15:
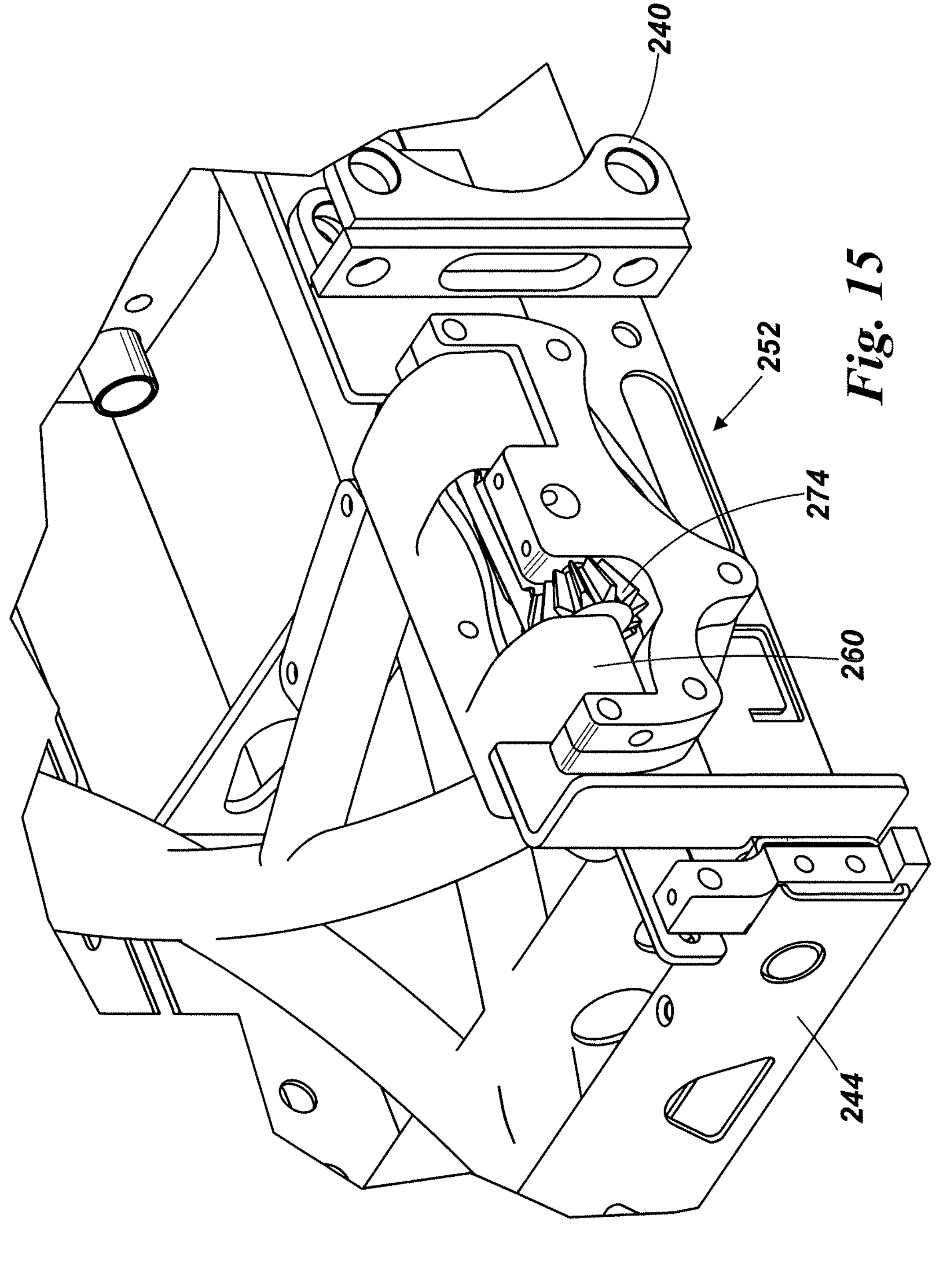
FIG. 15 is an enlargement of part of FIG. 14.
Figure 16:
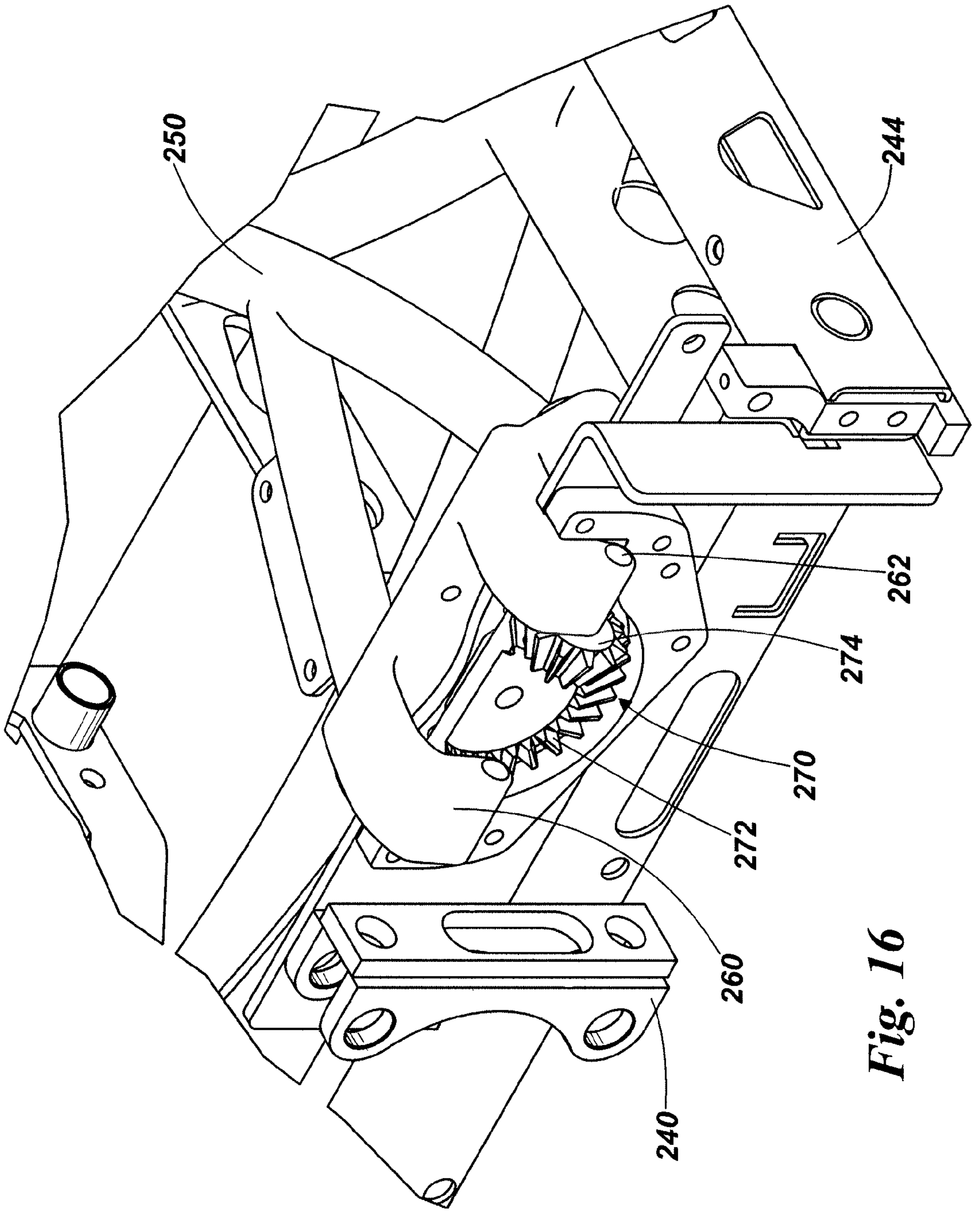
FIG. 16 is a perspective view of part of a handrail hinge and actuation mechanism of the assembly of FIG. 14.
Figure 17:
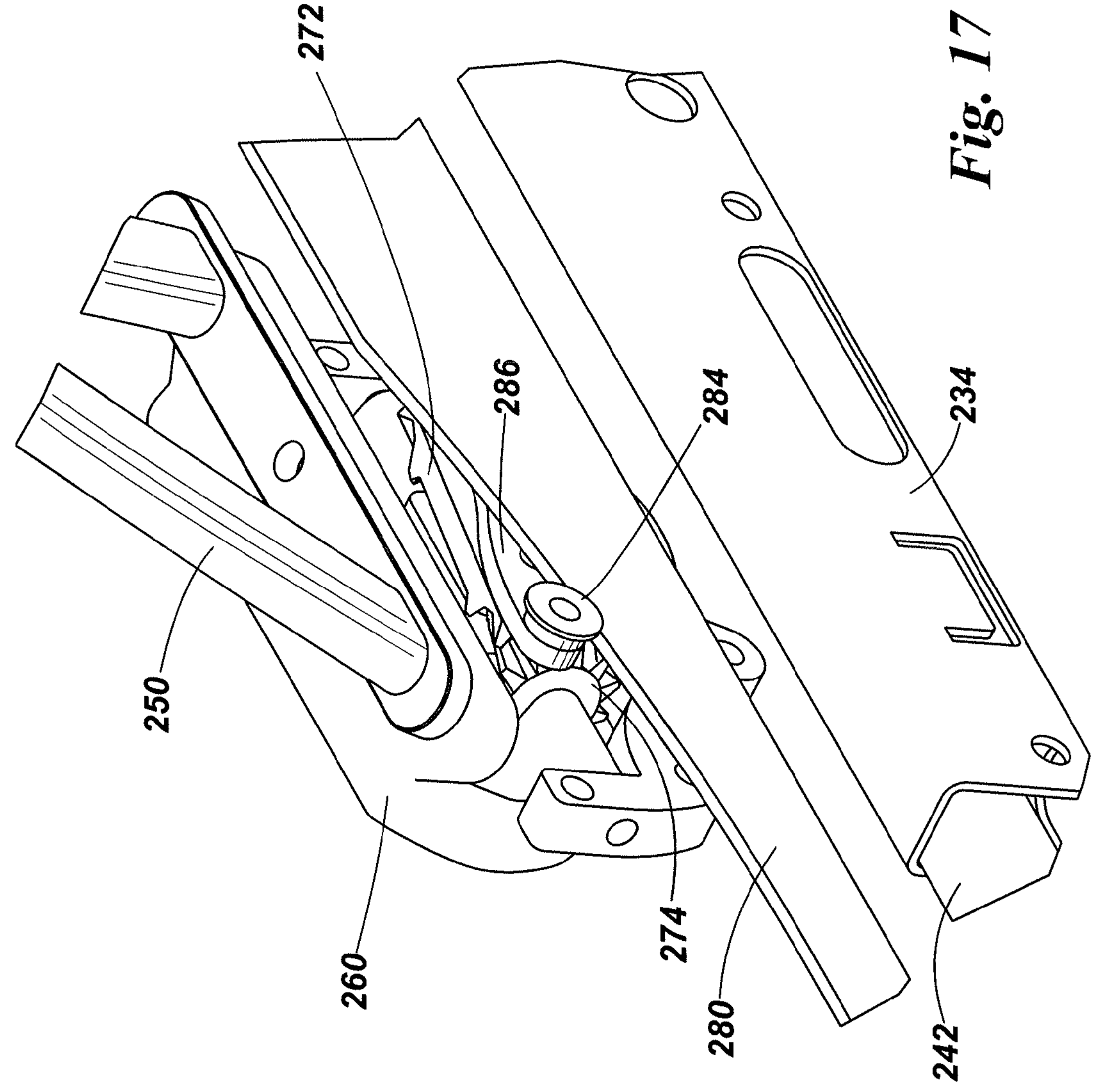
FIG. 17 is a perspective view of part of one of the hinge and actuation mechanisms of the assembly of FIG. 14 in a partially deployed condition.

Referring to FIGS. 9, 10 and 11, as the platform extension 32 moves outwards, the cam plates 80 move past the cam followers 84. While the lower front part 80*a* of the cam plates is in contact with the cam followers 84, the cam followers remain stationary. Then the sloped part 80*b* of the cam plate controlling the upper handrail 50 starts to push the cam follower 84 of that handrail upwards, which in turn rotates the actuation lever 70, pulling the actuation rod 64 downwards, and rotating the upper hinge member 60 and the handrail 50 upwards. The upper handrail 50 continues to be raised, and then as the sloped part 80*b* of the cam plate on the other side of the lift comes into contact with its cam follower 84, the lower handrail 50 also starts to be raised towards its deployed position. When both of the cam followers 84 are resting on the flat rear parts 80*c* of the cam plates, both of the handrails are fully raised as shown in FIG. 12. When the platform extension 32 is fully out and the handrails 50 fully raised, the out/up button 154 is pressed again. Since both of the cartridge valves 136, 142 and the depressurizing valve are closed, and as there is a non-return valve in the pressure line 122, the fluid in the pressure line and the lifting cylinders 22 is held there and the lift is held in the raised position, as shown in FIG. 4 and FIG. 12.

To lower the lift, the down/in button 156 is pressed. In response to this the handheld unit 152 is arranged to open the depressurizing valve 130 which depressurizes the pressure line 122 allowing fluid to escape from the lifting cylinders 22 and the lift to be lowered under its own weight, at a speed which is determined by the flow rate of the depressurizing valve 130. When the lift reaches the ground the lifting cylinders 22 stop supporting its weight and so the pressure in the pressure line dissipates. This allows the piston in the roll-off ramp cylinder 98 to be retracted under the influence of the roll-off ramp return spring 99, allowing the roll-off ramp 94 to fold down into its deployed position. To raise the lift, the out/up button 154 is pressed, and this turns on the pump 124 to pressurize the pressure line 122 which, when the pressure reaches a first level, causes the roll-off ramp cylinder 98 to raise the roll-off ramp, and then, when the roll-off ramp cylinder 98 is fully extended and the pressure increases to a second level, the lifting cylinders 22 to raise the lift. When the lift is fully raised, the out/up button 154 is released.

To stow the lift the lift is preferably in the raised position, but can be in any position except lowered onto the ground. The stow button 158 is pressed. This opens the tank cartridge valve 142. This releases the pressure in the extension cylinder allowing the platform extension 32 to be retracted into the main platform 30 by the return spring mechanism 92. As the platform extension moves inwards, the handrails 50 fold down under the force of a return spring and damped by the damper 73. The cam plate 90 profiles control the timing of the folding of the handrails 50 in the reverse of the unfolding process, so that the lower handrail folds down first and the upper handrail folds on top of it. While the pressure in the extension cylinder 90 is falling, the pressure cartridge valve 136 and the depressurizing valve 130 are kept closed so the pressure in the lifting cylinders 22 is maintained. When the platform extension 32 and handrails 50 are fully stowed, the in/down button 156 is pressed and this causes the depressurizing valve 130 to open allowing the lift to descend until it reaches the level of the box 10. At that point, the rear end of the platform extension side beams 42, which project from the rear of the platform, engage with a carriage lock mechanism to release the carriage 12 so that it can move along the rails 14. The stow button 130 can then be pressed again which causes the DC motor to operate pinions acting on the racks 21 to withdraw the lift fully into the stowage box 10.

Referring to FIGS. 14 to 17, in a lift system according to a second embodiment of the invention, the basic structure of the lift is the same as in the first embodiment, with similar parts indicated by the same reference numerals increased by 200. However, in this case the handrail hinge and actuation assembly 252 differs in that the lever 286 on which the roller cam follower 284 is supported is connected to the hinge upper member 260 by a gear mechanism 270. This comprises a first bevel gear 272 which is mounted on the side beam 234 for rotation about a common axis with the lever 286, and a second bevel gear 274 connected to the upper hinge member 260 and rotatable about the hinge pin 262 on which the hinge member 260 rotates. These two gears 272, 274 are meshed together so that movement of the lever 286 in response to movement of the cam follower 284 causes the hinge member 60 and hence the handrails 250 to rotate about their hinge axis.

In both of the embodiments described above it will be appreciated that the offset cams provide an efficient way of controlling the timing of the folding of the two handrails. However, this mechanism can also be used in lifts which include only one handrail on one side of the platform. Furthermore, in other embodiments, mechanisms other than a cam mechanism can be used to control the movement of the handrails in response to movement of the platform extension. For example a rack and pinion system, with the rack mounted on the platform extension and the pinion driving the handrail can be used.

The invention claimed is:

1. A lift system for mounting on a vehicle, the lift system comprising: a platform, the platform comprising a main platform and a platform extension slidable relative to the main platform; a handrail, pivotably mounted on the platform, having a stowed position and a deployed position and being movable between the positions; and a handrail raising mechanism arranged to be actuated by the platform extension sliding relative to the main platform to raise the handrail from the stowed position to the deployed position, wherein the raising mechanism comprises a cam member and a cam follower, the platform extension has a side and the cam member extends along the side of the platform extension, and the cam follower is mounted on the main platform.

2. A lift system according to claim 1 wherein the raising mechanism further comprises a rotatable member to which the cam follower is connected and which is arranged to be rotated by the cam follower to raise the handrail.

3. A lift system according to claim 2 wherein the handrail is pivotable about a first axis and the rotatable member is arranged to rotate about a second axis perpendicular to the first axis.

4. A lift system according to claim 3 further comprising an actuation rod, wherein the rotatable member is connected to the handrail by means of the actuation rod.

5. A lift according to claim 4 wherein the actuation rod has at least one end and a Rose joint at the at least one end.

6. A lift system according to claim 2 further comprising a gear mechanism, wherein the rotatable member is connected to the handrail by means of the gear mechanism.

7. A system according to claim 1 further comprising a further handrail, the further handrail having a stowed position and a deployed position, and a further raising mechanism arranged to raise the further handrail from its stowed position to its deployed position.

8. A system according to claim 7 wherein one of the handrails is arranged to extend over the other when they are both in their stowed positions, and the two raising mechanism are arranged to raise said one of the handrails before the other.

9. A system according to claim 8 wherein each of the raising mechanisms includes a respective cam having a cam profile, and the cam profiles are arranged to control the timing of the raising of the two handrails.

* * * * *